(12) United States Patent
Wheatley

(10) Patent No.: US 6,619,719 B1
(45) Date of Patent: Sep. 16, 2003

(54) TONNEAU COVER WITH ROTATING REAR RAIL AND AUTOMATIC TENSION CONTROL

(76) Inventor: Donald G. Wheatley, 4451 Ford Rd., Ann Arbor, MI (US) 48105-9422

( * ) Notice: Subject to any disclaimer, the term of this patent is extended or adjusted under 35 U.S.C. 154(b) by 0 days.

(21) Appl. No.: 10/150,376

(22) Filed: May 17, 2002

(51) Int. Cl.$^7$ .................................................. B60P 7/04
(52) U.S. Cl. ............... 296/100.15; 296/98; 296/100.12; 296/100.16; 296/100.18
(58) Field of Search ............................. 296/98, 100.01, 296/100.11, 100.12, 100.15, 100.16, 100.17, 100.18

(56) References Cited

U.S. PATENT DOCUMENTS

| | | | |
|---|---|---|---|
| 4,144,660 A | 3/1979 | Lamb | |
| 4,302,043 A | 11/1981 | Dimmer et al. | |
| RE31,746 E | 11/1984 | Dimmer et al. | |
| 4,635,700 A | * 1/1987 | Berger ..................... | 160/374.1 |
| 5,058,652 A | 10/1991 | Wheatley et al. | |
| 5,076,338 A | 12/1991 | Schmeichel et al. | |
| 5,121,960 A | 6/1992 | Wheatley | |
| 5,174,353 A | 12/1992 | Schmeichel et al. | |
| 5,251,951 A | 10/1993 | Wheatley | |
| 5,288,123 A | 2/1994 | Dimmer | |
| 5,487,584 A | 1/1996 | Jespersen | |
| 5,788,315 A | 8/1998 | Tucker | |
| 5,906,407 A | 5/1999 | Schmeichel | |
| 5,924,758 A | 7/1999 | Dimmer et al. | |
| 5,934,735 A | 8/1999 | Wheatley | |
| 5,938,270 A | 8/1999 | Swanson et al. | |
| 6,024,401 A | 2/2000 | Wheatley et al. | |
| 6,030,021 A | * 2/2000 | Ronai ........................... | 296/98 |
| 6,126,226 A | * 10/2000 | Wheatley ............... | 296/100.17 |
| 6,257,647 B1 | * 7/2001 | Ninness et al. ........ | 296/100.15 |
| 6,293,608 B1 | * 9/2001 | Dicke et al. ........... | 296/100.15 |
| 6,309,006 B1 | * 10/2001 | Rippberger ............ | 296/100.16 |

OTHER PUBLICATIONS

Access Roll–Up Cover Owner's Manual; 1996 Agri–Cover, Inc.

* cited by examiner

Primary Examiner—Joseph D. Pape
Assistant Examiner—H. Gutman
(74) Attorney, Agent, or Firm—Harness, Dickey & Pierce, P.L.C.

(57) ABSTRACT

A tonneau cover apparatus comprises a frame structure having a pair of laterally spaced apart side rails, an end rail, and a pair of connector assemblies. The connector assemblies are coupled to the end rail, and are movably mounted to an associated side rail to thereby movably interconnect the end rail to the side rails. A pair of springs bias the connector assemblies in a direction outwardly from the side rails such that the end rail applies a force to the flexible cover to maintain the flexible cover in a taut state. Each connector assembly includes a fixed component and a rotatable component. The fixed component includes an aperture and a first plug end secured to an associated side rail. The rotatable component includes a post end and a third plug end removably secured to the end rail. The post end is thus removably secured to the aperture.

22 Claims, 7 Drawing Sheets

TONNEAU COVER WITH ROTATING REAR RAIL AND AUTOMATIC TENSION CONTROL

FIELD OF THE INVENTION

This invention relates to a tonneau cover and more particularly to a tonneau cover whose tautness is maintained without intervention by the user, and which allows simple access to the cargo area with a rotating rear rail.

BACKGROUND OF THE INVENTION

Tonneau covers are generally used to cover the cargo box of a vehicle, such as a pick-up truck. A typical tonneau cover includes two primary components: a cover sheet made of fabric or other flexible, preferably waterproof, material; and a frame structure to which the perimeter of the cover sheet is removably attached and which is usually employed to removably position the cover sheet over the bed of a vehicle. The frame generally comprises four rails: a left and a right side rail, which are removably affixed to each respective and opposed sidewall of a pick-up bed, and a front and a rear rail, which are respectively positioned near the passenger cab and the tailgate. Different rail configurations are possible for varying pickup bed configurations. Moreover, the front and rear rails are usually connected to each of the side rails by connector assemblies which are generally manufactured from a material, such as, aluminum or plastic and which allow the rails to cooperatively and removably form a tonneau cover frame.

Previous tonneau cover assemblies typically lack an easy and convenient means to remove the tonneau cover from a vehicle to gain access to the enclosed area. Complex user manipulation of the tonneau cover frame and cover was also typically required to place large objects into the cargo area or otherwise remove the rear rail of the tonneau cover frame.

Furthermore, the known tonneau cover frame assemblies generally required user intervention to maintain the tonneau cover in a taut state during the lifetime of the tonneau cover. Stretching of the fabric cover due to seasonal temperature changes and daily thermal exposure, for example, causes the tonneau cover to expand and thus sag over the tonneau cover frame. User initiated tensioning of the tonneau cover would re-tension the cover to return it to its original taut state.

SUMMARY OF THE INVENTION

The above and other objects are provided by a tonneau cover system in accordance with the preferred embodiments of the present invention. In one preferred form, the present invention provides a tonneau cover apparatus having a frame structure, a pair of springs and a flexible cover. The frame structure has a pair of laterally spaced apart side rails, an end rail, and a pair of connector assemblies. Each of the connector assemblies is coupled to the end rail and movably mounted to an associated one of the side rails to moveably interconnect the end rail to the side rails. Each of the springs is coupled to one of the side rails and contacts an associated one of the connector assemblies. The flexible cover is removably attached to at least a portion of the frame structure. The springs bias the connector assemblies in a direction outward from the side rails and cause the end rail to apply a force to the flexible cover to maintain the flexible cover in a taut state.

The tonneau cover of another preferred embodiment of the present invention mounts to the cargo box of a vehicle. The tonneau cover includes the frame of the tonneau cover and the cover that is removably attached to the frame. The frame of the tonneau cover includes side rails, a rear rail, and a front rail, all of which are joined by connector assemblies. The frame further includes a spring keeper assembly to maintain tautness of the tonneau cover. The front corner of tonneau cover frame, which is generally located just behind the cab of an open bed vehicle, includes the front rail, the associated side rail, and the front connector assembly, which comprise the front corner. The rear corner of the tonneau cover frame, which is generally located at the rear of the vehicle, includes the rear rail, the associated side rail, and the rear connector assembly. The spring keeper is generally found in the rear portion of the side rail and is connected to the rear connector assembly. The tonneau cover, the front rail, the rear rail, the side rails, associated connector assemblies, and the spring keeper assembly comprise the tonneau cover system.

In accordance with the preferred embodiment of the present invention, the front connector assemblies are a single rigid perpendicular unit, while the rear connector assemblies are a two piece perpendicular unit that interlocks in such a way to provide a rotating corner. The front connector assemblies of the tonneau cover frame tie the front rail to the associated side rails to form the front corners of the tonneau cover frame. The front connector assemblies when connected provide a rigid corner of the frame, but are easily removed by one person and without the use of tools. The rear connector assemblies are comprised of two pieces, one of which joins with the rear rail and the other with the associated side rail. The two piece design enables the user to conveniently detach the rear rail from the tonneau cover frame without having to disassemble and reassemble the rear connector assemblies.

The rotating rear connector assemblies provide for easy access to the cargo box, while providing a convenient means to open and close the tonneau cover. The two-piece connector assemblies unlock and detach from each other, allowing the user to roll the rear rail inside the tonneau cover toward the front of the vehicle. The user is able to detach the rear rail by use of the locking tabs and detents on the rear connector assemblies but needs to neither disassemble nor remove the rear connector assemblies to remove the rear rail. Closure of the tonneau cover is accomplished by inserting the rear rail and the associated rotating components of the rear connector assemblies back into the associated fixed components of the rear connector assemblies attached to the associated side rails. Closure causes the two piece rear connector assembly to latch and hold the rear rail in place, thereby returning the tonneau cover frame to its closed configuration.

In accordance with the preferred embodiment of the present invention, the spring keeper assembly resides in the rear portion of the side rail and in direct engagement with the rear connector assembly. The spring keeper is comprised of housing, a spring, and a spring retaining device. The housing is secured in the rear rail in close proximity to the rear connector assembly, whereby the spring contained in the fixed housing can exert a force on the rear connector assembly. The force applied by the spring forces the rear connector assembly to translate in a direction opposite the front connector assembly. The translation of the rear connector assembly results in the increase of the distance between the front rail and the rear rail thereby maintaining the tonneau cover in a taut state. The spring keeper assembly maintains tautness of the tonneau cover without intervention by the user.

BRIEF DESCRIPTION OF THE DRAWINGS

The various advantages of the present invention will become apparent to one skilled in the art by reading the following specification and claims and by referencing the following drawings in which:

DETAILED DESCRIPTION OF THE PREFERRED EMBODIMENTS

Figure 1:
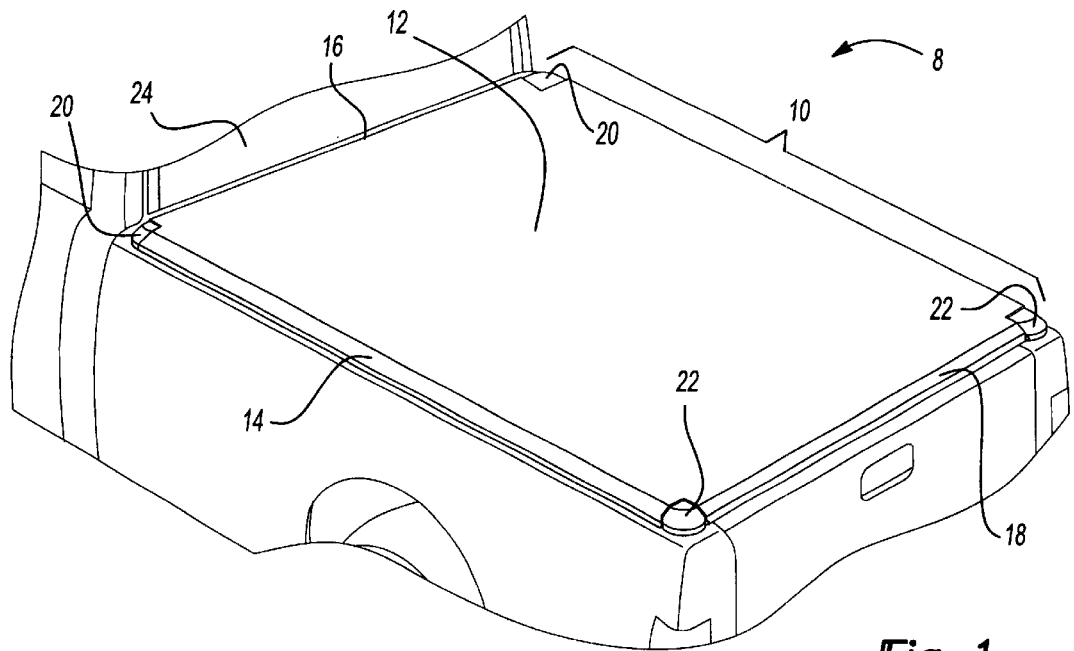
FIG. 1 is an environmental perspective view of a tonneau cover system constructed in accordance with the teachings of the present invention, with the tonneau cover shown in the closed position and attached to the cargo box of a vehicle.
Figure 2:
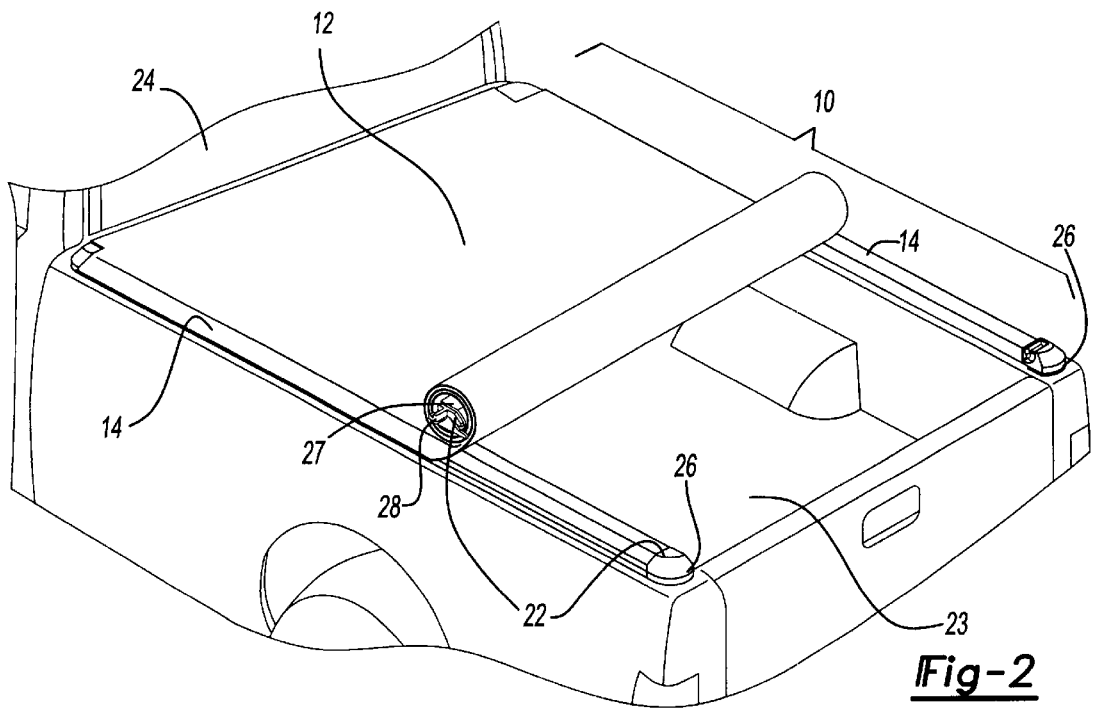
FIG. 2 is an environmental perspective view of the tonneau cover system of FIG. 1 illustrating the tonneau cover in a partially rolled up condition.

With reference to FIGS. 1 and 2 of the drawings, a tonneau apparatus or system constructed in accordance with the teachings of the present invention is generally indicated by reference numeral 8. The tonneau cover system 8 includes a frame structure 10 and a flexible tonneau cover 12. The tonneau cover 12 is closed and attached to the frame structure 10.

In the particular embodiment illustrated, the frame structure 10 includes a pair of side rails 14, a front rail 16, a rear rail 18, front connector assemblies 20, and rear connector assemblies 22. The frame structure 10 is attached to the cargo box 23 of a vehicle 24. Although the particular vehicle illustrated is a pick-up truck, those skilled in the art will appreciate that the tonneau cover system 8 may be used with other vehicles types and as such, the exemplary vehicle illustrated is not intended to limit the scope of the disclosure in any manner. Those skilled in the art will also appreciate that the front rail 16 may be optionally omitted from the frame structure 10 in an appropriate situation, as when the tonneau cover 12 is permanently affixed to the cargo box 23.

The tonneau cover 12 is coupled to the frame structure 10 such that the frame structure 10 is positionable between a closed condition, which is illustrated in FIG. 1, and an open position, which is illustrated in FIG. 2. The means by which the tonneau cover 12 is coupled to the frame structure 10 is conventional, with one such means being described in U.S. Pat. No. 5,934,735 to Wheatley, which is incorporated by reference as if fully set forth herein.

With specific reference to FIG. 2, the tonneau cover 12 is illustrated as being wrapped around the rear rail 18. The tonneau cover 12 detaches in a conventional manner from the associated side rail 14 as it is rolled, with one such means being described in U.S. Pat. No. 5,934,735 to Wheatley. As the tonneau cover 12 is rolled, it is wrapped about the rear rail 18. The tonneau cover 12 remains attached to the rear rail 18 while it is rolled. Additional use of VELCRO® 27, or similar hook and loop type fasteners, prevents further axial movement of the rear rail 18 along its longitudinal axis.

The rear rail 18 is kept close to the fabric of tonneau cover 12 to ensure a small moment arm against which the fabric can pull while the user locks the rear rail 18 into the closed position.

With reference to FIG. 2, the rear connector assemblies 22 are illustrated to include a fixed component 26 and a rotatable component 28. Each fixed component 26 is attached to an associated side rail 14 and remains fixed to the vehicle 24. Each rotatable component 28 is attached to the rear rail 18 and rotates when the tonneau cover 12 is opened. The rear connector assemblies 22 are shown in greater detail in FIGS. 3 and 4.

Figure 3:
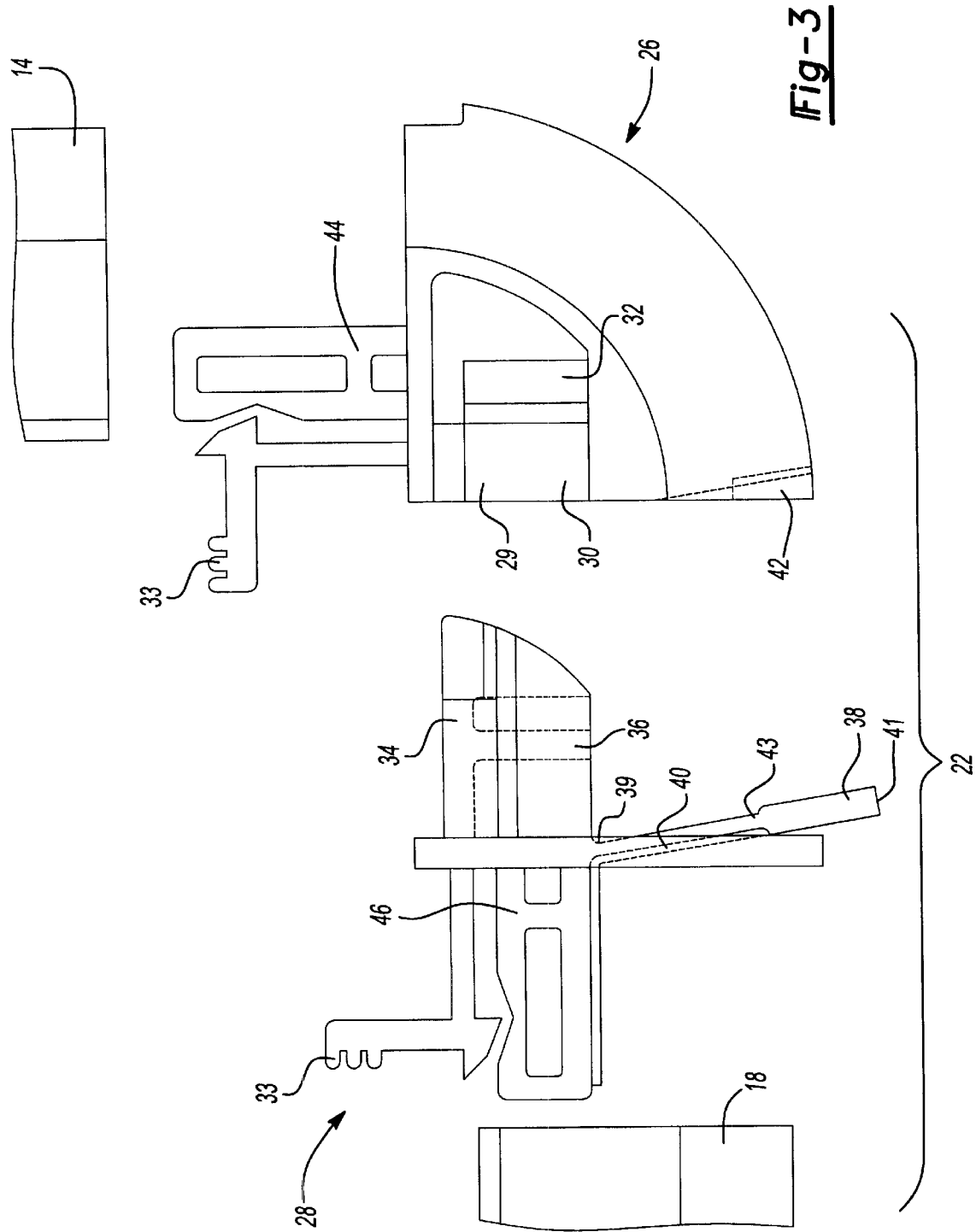
FIG. 3 is a top plan view of a portion of the tonneau cover system in FIG. 1 illustrating the rear connector assembly components in a detached condition.

In FIG. 3, the fixed component 26 and the rotatable component 28 of the rear connector assembly 22 are shown aligned but detached from one another. The fixed component 26 includes a first plug end 44, which includes a clip 33 and a detent 42 that accepts the locking tab 38. The fixed component 26 also includes a second end 29 that defines an aperture 30, within which is formed a mating slot 32.

The first plug end 44 and the aperture 30 are generally orthogonal to each other.

Figure 9:
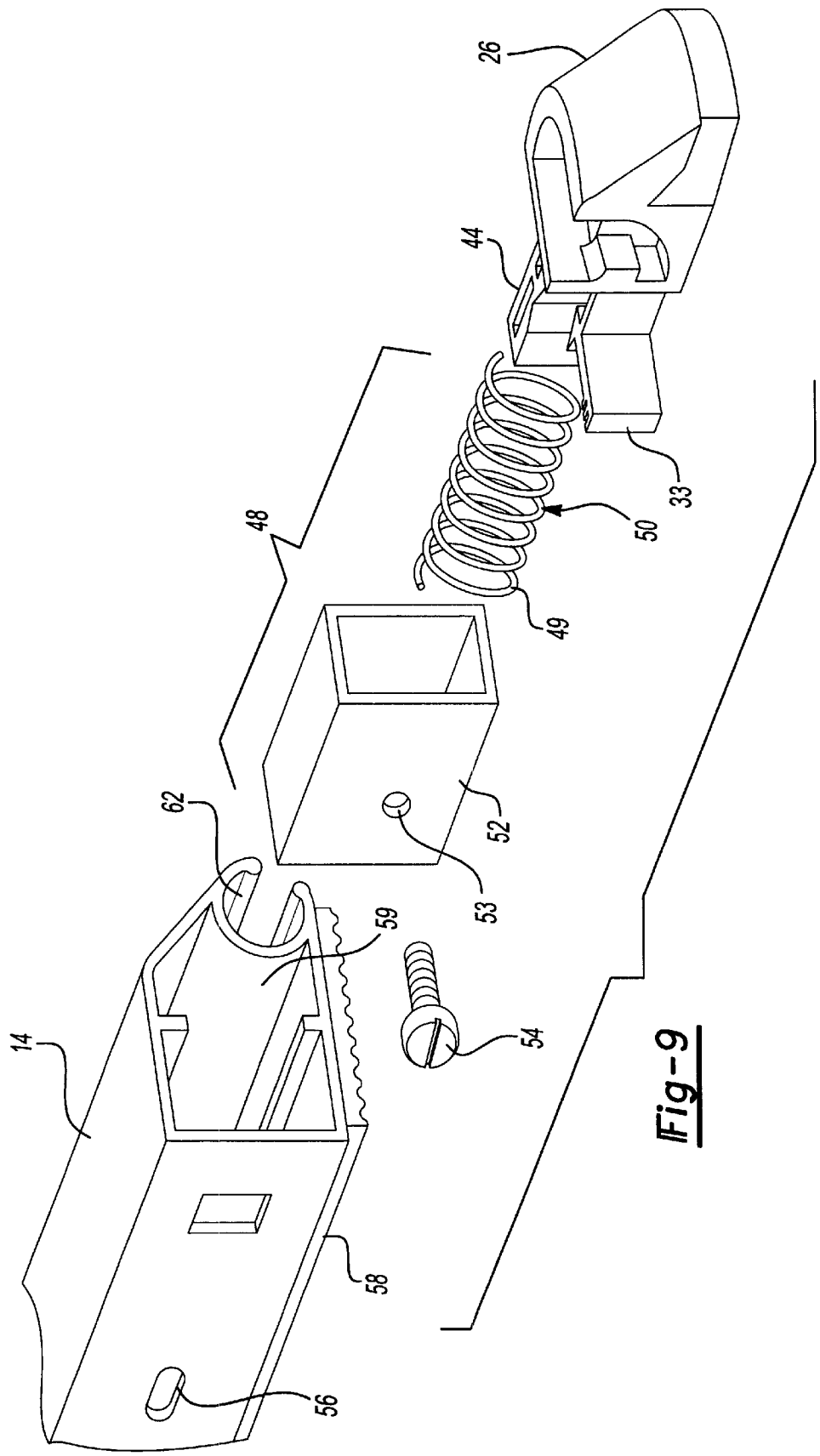
FIG. 9 is a an exploded perspective view of a portion of the tonneau cover system of FIG. 1, but illustrating the spring keeper assembly in greater detail.

The first plug end 44 removably secures to the associated side rail 14 as shown in greater detail in FIG. 9. First plug end 44 is inserted into the associated side rail 14 and a clip 33 removably secures the fixed component 26 to the associated side rail 14 as in a manner that is disclosed in U.S. Pat. No. 5,934,735.

The rotatable component 28 includes a post end 34, which includes a pawl 36, a third plug end 46 and a clip 33. The third plug end 46 and the post end 34 are generally colinear.

The rotatable component 28 further includes a locking tab 38. The locking tab 38 is thin at its base 39, or first end, to allow for easy flexing but thicker at the tip 41, or second end, to aide in use. In the particular example provided, the locking tab 38 has a rectangular cross-section where the base measures about 0.5 inches by about 0.06 inches, and the tip measures about 0.25 inches by about 0.12 inches.

Reinforcement 40 is assembled in locking engagement with the indentation 43 of the locking tab 38 to provide a constant force. The force upon the locking tab 38 results in greater resiliency, thereby counteracting the possible loss in resiliency when the tonneau cover system components expand due to changes in ambient temperatures.

The third plug end 46 is fixedly but removably coupled to the rear rail 18. Third plug end 46 is inserted into rear rail 18 and clip 33 removably secures the rotatable component 28 to the rear rail 18 as in a manner disclosed in U.S. Pat. No. 5,934,735.

Figure 4:
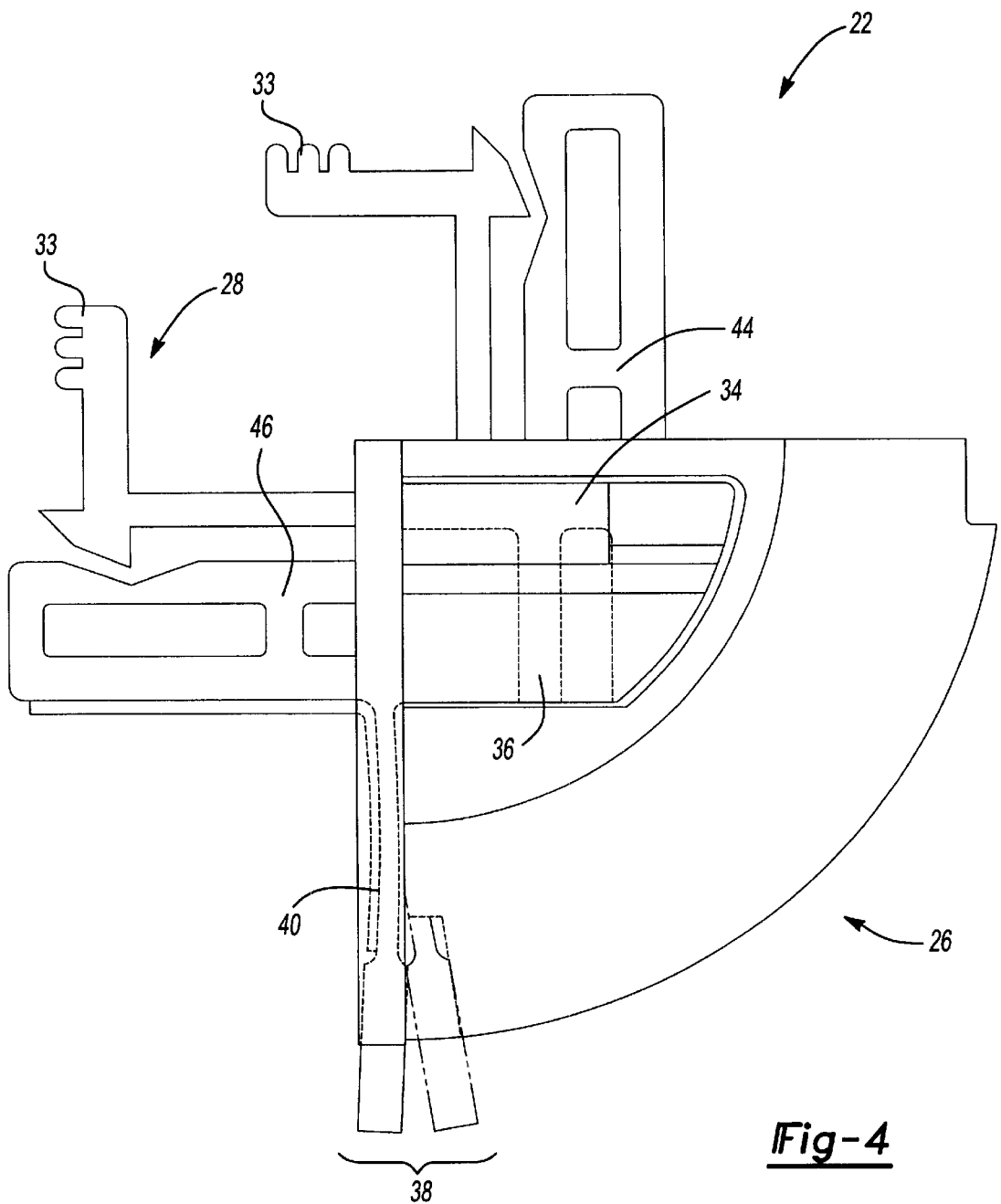
FIG. 4 is a top plan view similar to that of FIG. 3 but illustrating the rear connector assembly in an assembled condition.
Figure 5:
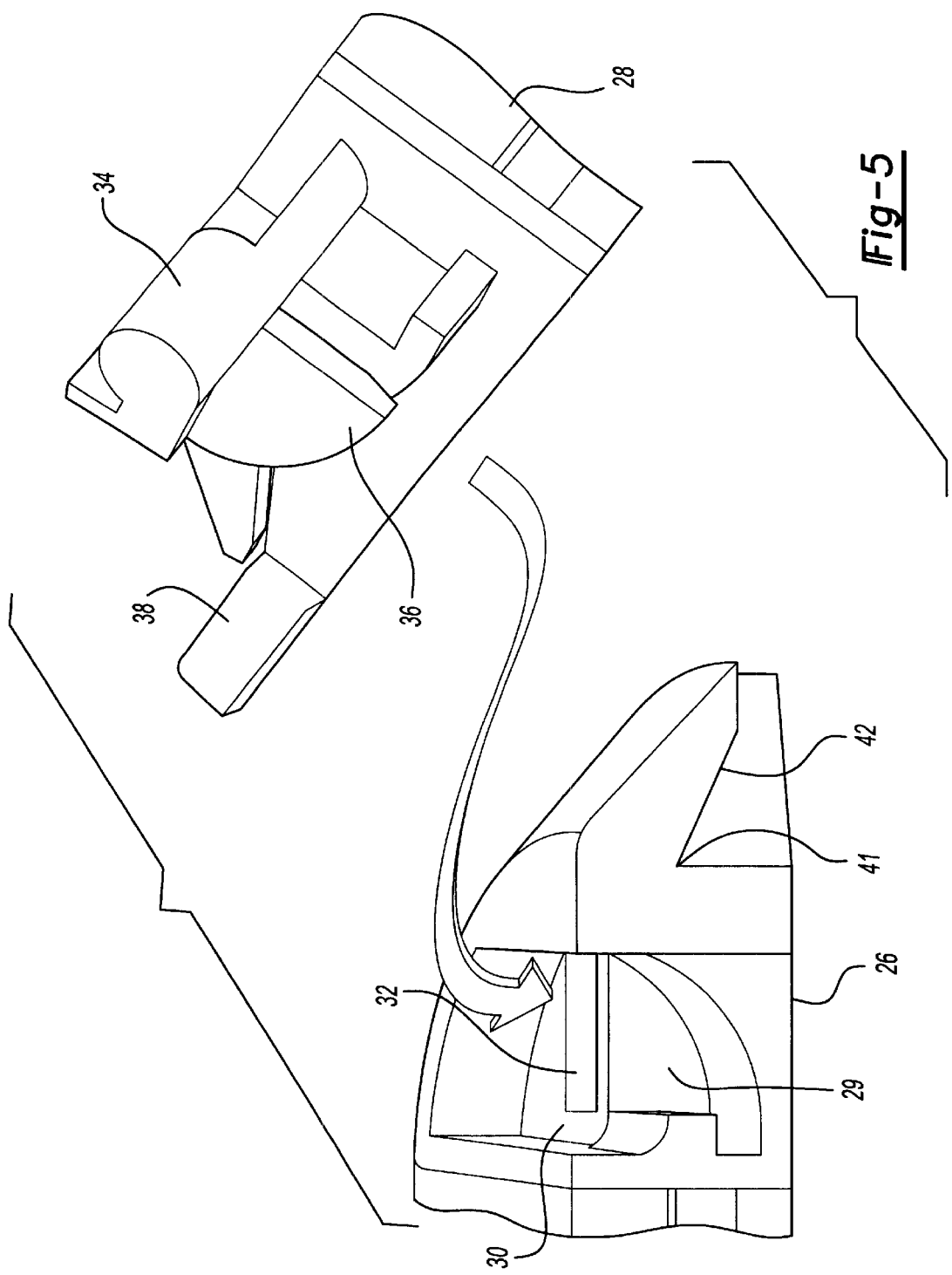
FIG. 5 is an exploded perspective view of a portion of the rear connector assembly of the tonneau cover system in FIG. 1.

Referring to FIGS. 3 and 4, the post end 34 is removably disposed within aperture 30; as such, pawl 36 inserts into mating slot 32 as shown in greater detail in FIG. 5. The rotatable component 28 is rotated into locking engagement with the fixed component 26, the progression of which is shown in greater detail in FIGS. 6, 7, and 8.

With specific reference to FIG. 4, the rear connector assembly 22 is shown assembled such that the rotatable component 28 is secured to the fixed component 26. Locking tab 38 is shown in the open position and shown in phantom in a closed position, wherein the detent 42 has captured the locking tab 38.

Referring to FIG. 5, the rear connector assembly 22 is shown in a disassembled condition. The fixed component 26 is shown with the mating slot 32 exposed along with the detent 42. The detent 42 accepts the locking tab 38, and the mating slot 32 accepts the pawl 36. The post end 34 of the rotatable component 28 is inserted into the aperture 30 of the fixed component 26, according to the progression shown in FIGS. 6, 7, and 8.

Figure 6:
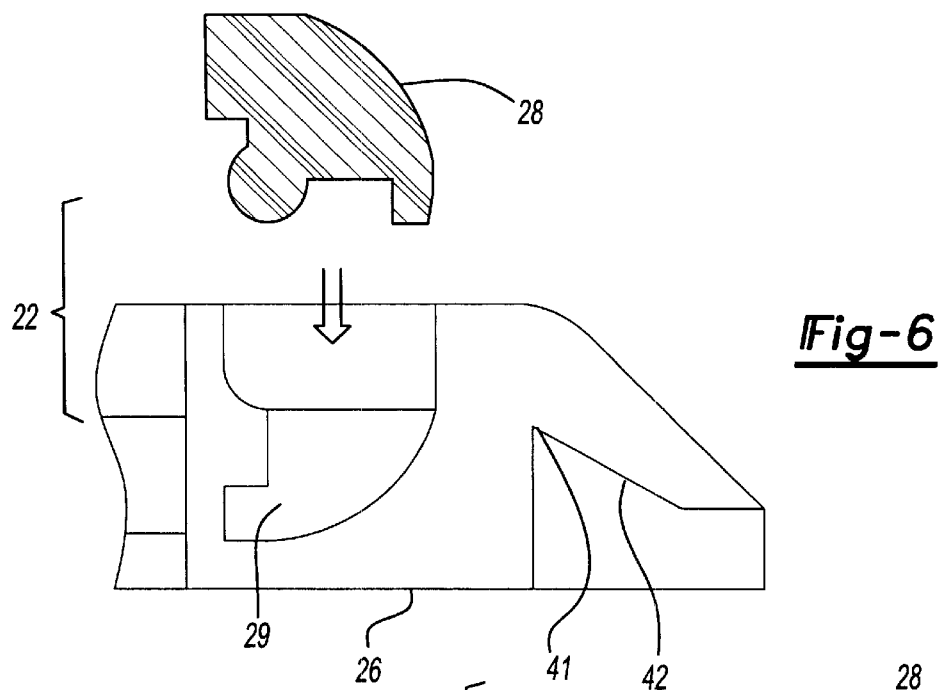
FIG. 6 is a partial sectional view of a portion of the tonneau cover system of FIG. 1 illustrating the rear rail in rotated condition preparatory to engaging the rotatable component to the fixed component of the rear connector assembly.
Figure 7:
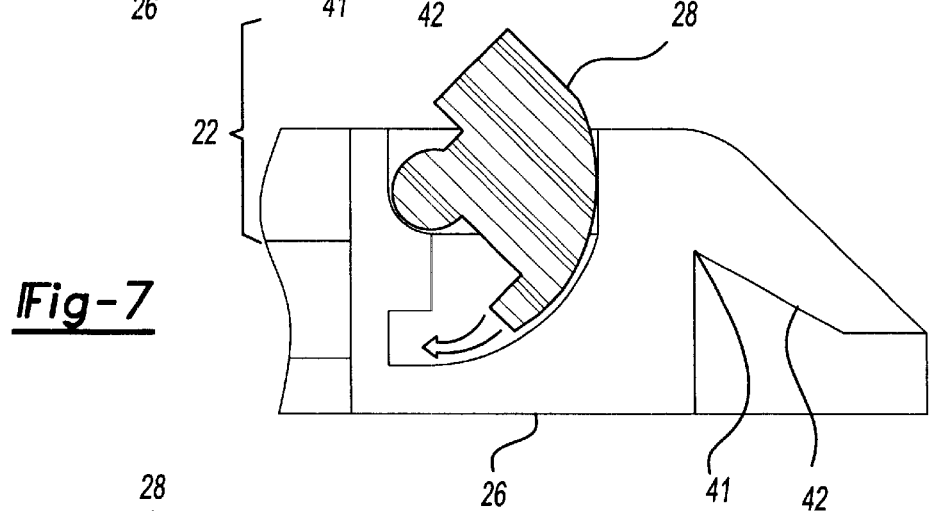
FIG. 7 is a partial section view similar to FIG. 6 but illustrating the rotatable component partially engaged to fixed component.
Figure 8:
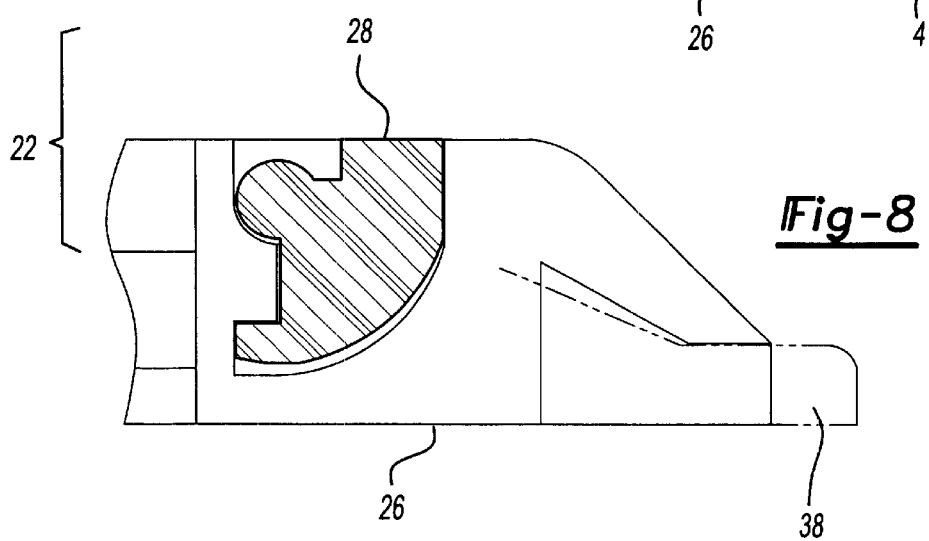
FIG. 8 is a partial section view similar to FIG. 6 but illustrating the rotatable component fully engaged to fixed component.

In FIGS. 6, 7, and 8, the progression of the rotatable component 28 is illustrated as it is locked into the fixed component 26. As the fixed component 26 progresses into the locked position as shown in FIGS. 4 and 8, the locking tab 38 travels down a ramp 41 into the detent 42. Once the locking tab 38 is in the detent 42, the depth of the detent 42 is deep enough to capture the locking tab 38, so that the rotatable component 28 is prevented from moving unless the locking tab 38 is released by the user.

The front connector assemblies 20 are conventional; as such, one example of their material and construction is described in U.S. Pat. No. 5,934,735. The rear connector assemblies 22 are constructed of a plastic, but also could be constructed of metal or any other appropriate material. In the preferred embodiment of the present invention, the rear connector assemblies 22 are constructed of NYLON® or other similar polyamides. The front rail 16, the rear rail 18, and the pair of side rails 14 are constructed of a metal, but also could be constructed of plastic, or any other appropriate material. In the preferred embodiment of the present invention, the front, rear, and pair of side rails 16, 18, 14 are constructed of extruded aluminum. The reinforcement 40 for locking tab 38 is constructed of metal, but could be constructed of plastic or any other appropriate material according to one skilled in the art. In the particular example provided, the reinforcement 40 is constructed of stainless steel with the thickness of about 0.02 inches and is in side-by-side locking engagement with the locking tab 38.

Referring to FIG. 9, the spring keeper assembly 48 is illustrated in association with a side rail 14 and a fixed component 26. Side rail 14 includes an opening 59 to accept the spring keeper assembly 48 and the fixed component 26. Side rail 14 also includes an elongated groove 56, weather stripping 58, and a bight 62. Fixed component 26 includes a first plug end 44 and a clip 33. The spring keeper 48 includes a spring 50 with coils 49, a housing 52 with a threaded opening 53 and a spring retaining device 54.

Figure 10:
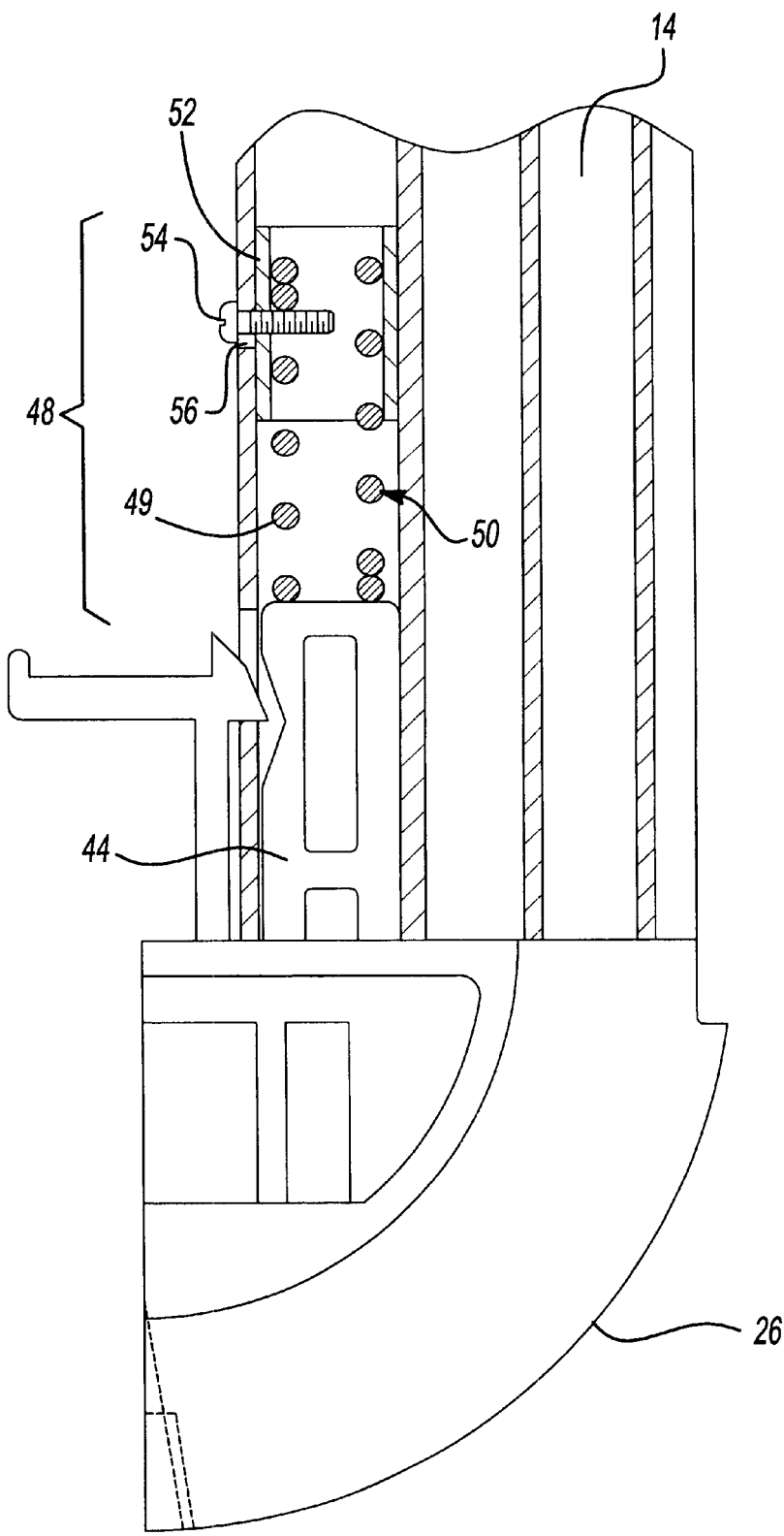
FIG. 10 is partial sectional view of a portion of the tonneau cover system of FIG. 1 illustrating the spring keeper assembly in an assembled condition in a side rail, similar to that of FIG. 1.

The spring 50 is contained within the housing 52 and held in place by the spring retaining device 54, which in the particular embodiment illustrated, is a conventional threaded fastener that is threadably engaged to the housing 52 through the threaded opening 53 and disposed through the coils 49 of the spring 50, as illustrated in FIG. 10.

The coils 49 of the spring 50 are contained within the housing 52. As such, housing 52 is inserted in the opening 59 of the associated side rail 14, such that the threaded opening 53 aligns with the groove 56. After the housing 52 is inserted and aligned the spring retaining device 54 is inserted through an elongated groove 56 and then through the threaded opening 53.

The spring retaining device 54 is inserted into and held by the threaded opening 53 of housing 52, thereby securing the housing 52 to the inside of the side rail 14. Spring retaining device 54 can be loosened to allow the spring keeper 48 to translate longitudinally in the associated side rail 14.

The end of the spring retaining device 54 traps the coils 49 of spring 50 in the housing 52, such that spring retaining device 54 is inserted through the elongated groove 56, through the threaded opening 53, and then through the coils 49 of the spring 50. Alternatively, the housing 52 has a closed end that traps the coils 49 of the spring 50, such that the spring retaining device 54 does not protrude into the housing 52 and interfere in between the coils 49 of spring 50.

Weather stripping 58 provides a seal between the tonneau cover and the lip of the cargo box (not shown). Bight 62 cooperates with the cylindrical fastening system of the tonneau cover (not shown), in a manner disclosed in U.S. Pat. No. 5,934,735.

Referring to FIG. 10 there is shown a sectional top view of the spring keeper assembly 48 assembled, an associated side rail 14, and a fixed component 26 in accordance with the preferred embodiment of the present invention. The coils 49 of spring 50 are shown in housing 52. Spring retaining device 54 is shown interdisposed between the coils 49 of the spring 50. Fixed component 26 includes the first plug end 44 inserted into the associated side rail 14. The elongated groove 56 is shown with the spring retaining device 54 inserted therein.

Spring retaining device 54 is shown inserted through the elongated groove 56, wherein the spring retaining device 54 is in a full forward position within the elongated groove 56. The full forward position of the housing 52 and spring retaining device 54 correspond to the farthest position from the fixed component 26. Different positions of the spring retaining device 54 and housing 52 in the elongated groove 56 provide differing levels of force on the fixed component 26.

As explained above, setting the spring retaining device 54 full rearward in the elongated groove 56 positions the housing 52 closest to the fixed component 26. The shorter the distance between the housing 52 and the fixed component 26 the more force the coils 49 of the spring 50 apply against the first plug end 44 of the fixed component 26. Ultimately, the distance the spring retaining device 54 can travel is limited by the length of the elongated groove 56.

Referring to FIG. 1 and FIG. 10, the force of the spring 50 applied to the first plug end 44 pushes the fixed the component 26 outward from the associated side rail 14, such that the distance will increase between the fixed component 26 and the associated side rail 14. When the tonneau cover system 8 is in the closed position as shown in FIG. 1, the rear rail 18 is locked into the rear connector assembly 22. As such, the spring keeper assembly 48 exerts a force on the first plug end 44, thereby exerting a force on the rear connector assembly 22. With the rear rail 18 locked into the rear connector assembly 22, the rear rail 18 and rear connector assembly 22 translate in a direction opposite the front rail 16. The increase in distance between the rear rail 18 and the front rail 16 increase the tautness on the tonneau cover 12.

To that end, the different positions of the spring keeper assembly 48 within the associated side rail 14 are determined by the position of the spring retaining device 54 in the elongated groove 56. As such, differing positions of the spring retaining device 54 will apply differing amounts of force on the first plug end 44. Advancing the spring retaining device 54 full rearward in the elongated groove 56, such that it is closer to the rear rail 18, will apply the most force to the first plug end 44. Conversely, positioning the spring retaining device 54 in the full foreword position in the elongated groove 56, such that the spring retaining device 54 is farthest from the rear rail 18, will apply the least amount of force on the rear rail 18.

Proper positioning of the spring retaining device 54 within the elongated groove 56 may be dictated by the age of the tonneau cover 12 (the tonneau cover may stretch) or, the ambient temperature to which the tonneau cover 12 is exposed. (Elevated ambient temperatures may cause the tonneau cover 12 to expand.) Positioning the spring retaining device 54 in the full rearward position for the greatest amount of force or the full foreword position for the least amount of force will maintain the tautness of the tonneau cover 12 depending on the amount of tautness control required.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A tonneau cover apparatus comprising:
    a frame structure having a pair of laterally spaced apart side rails, an end rail and a pair of connector assemblies, each of the connector assemblies being coupled to the end rail and movably mounted to an associated one of the side rails to thereby movably interconnect the end rail to the side rails;
    a pair of springs, each of the springs being coupled to one of the side rails and contacting a corresponding one of the connector assemblies; and
    a flexible cover removably attached to at least a portion of the frame structure,
    wherein the springs bias the connector assemblies in a direction outwardly from the side rails such that the end rail applies a force to the flexible cover to maintain the flexible cover in a taut state,
    wherein rotation of the end rail causes the tonneau cover to move between an open and a closed position.

2. The tonneau cover apparatus of claim 1, wherein each of the connector assemblies includes a fixed component and a rotatable component, the fixed component including a first plug end and a second end, the first plug end being removably secured to the associated one of the side rails, the second end having an aperture; the rotatable component including a third plug end and a post end, the third plug end being removably secured to the end rail; and the post end is removably disposed within the aperture.

3. The tonneau cover apparatus of claim 2, wherein the aperture includes a mating slot; the post end includes a pawl; and the pawl engages the mating slot when the rotatable component is removably secured to the fixed component.

4. The tonneau cover apparatus of claim 2, wherein the second end, defining the aperture, and the first plug end are generally orthogonal.

5. The tonneau cover apparatus of claim 2, wherein the third plug end and the post end are generally collinear.

6. The tonneau cover apparatus of claim 2, wherein each of the connector assemblies includes a locking tab, a reinforcement and a detent; the locking tab is fixedly secured to the rotatable component; the reinforcement engages the locking tab, wherein the reinforcement presses against the locking tab; the fixed component includes the detent, wherein the detent accepts said locking tab of the rotatable component; and the locking tab prevents rotation of the rotatable component when the rotatable component is removably secured to the fixed component and the locking tab engages the detent.

7. The tonneau cover apparatus of claim 6, wherein the reinforcement is formed from a metal.

8. The tonneau cover apparatus of claim 6, wherein the locking tab includes a first end and a second end distal from the first end; the first end is fixedly secured to the rotatable component; and the second end further includes an indentation, wherein said reinforcement engages the indentation.

9. A tonneau cover apparatus comprising:
    a frame structure having a pair of laterally spaced apart side rails, a front rail, a rear rail, a pair of front connector assemblies and a pair of rear connector assemblies, each of the front connector assemblies being coupled to the front rail and secured to an associated one of the side rails, each of the rear connector assemblies being coupled to the rear rail and movably mounted to the associated one of the side rails to thereby movably interconnect the rear rail to the side rails;
    a pair of springs, each of the springs being coupled to one of the side rails and contacting a corresponding one of the rear connector assemblies; and
    a flexible cover removably attached to at least a portion of the frame structure,
    wherein the springs bias the rear connector assemblies in a direction opposite the front rail such that the rear rail applies a force to the flexible cover to maintain the flexible cover in a taut state,
    wherein rotation of the rear rail causes the tonneau cover to move between an open and a closed position.

10. The tonneau cover apparatus of claim 9, wherein each of the rear connector assemblies includes a fixed component and a rotatable component; the fixed component includes a first plug end and a second end defining an aperture, the first plug end is removably secured to the associated one of the side rails; the rotatable component includes a third plug end and a post end, the third plug end is removably secured to the end rail; and the post end is removably secured to the aperture.

11. The tonneau cover apparatus of claim 10, wherein the aperture includes a mating slot; the post end includes a pawl; and the pawl engages the mating slot when the rotatable component is removably secured to the fixed component.

12. The tonneau cover apparatus of claim 10, wherein each of the rear connector assemblies further includes a locking tab, a reinforcement and a detent; the locking tab is fixedly secured to the rotatable component; the reinforcement engages the locking tab, wherein the reinforcement presses against the locking tab; the fixed component includes the detent, wherein the detent accepts the locking tab of the rotatable component; and the locking tab prevents rotation of the rotatable component when the rotatable component removably secures to the fixed component of the rear connector assemblies and the locking tab engages the detent.

13. The tonneau cover apparatus of claim 9, wherein each of the springs is contained within a spring keeper having a housing and a spring retaining device, the housing being movably mounted to the associated side rail; the spring retaining device being fixedly secured to the housing and translating within a grove of the associated side rail.

14. The tonneau cover apparatus of claim 13, wherein the spring retaining device fixedly secures each of the springs to the housing.

15. The tonneau cover apparatus of claim 10, wherein the first plug end and the second plug end having an aperture are generally orthogonal.

16. The tonneau cover apparatus of claim 10, wherein the third plug end and the post end are generally collinear.

17. The tonneau cover apparatus of claim 12, wherein the reinforcement is formed from a metal.

18. The tonneau cover apparatus of claim 12, wherein said locking tab comprises a first end and a second end opposite from said first end; said first end is fixedly secured to said rotatable component; and said second end further comprises an indentation, wherein said reinforcement engages said indentation.

19. A method of maintaining tautness of a tonneau cover over a cargo box of a vehicle comprising the steps of:
providing an end rail;
providing a pair of side rails;
attaching the tonneau cover to one of the end rail and the pair of side rails;
providing spring assemblies;
securing the spring assemblies within the associated side rail,
attaching the spring assemblies to connector assemblies;
attaching the connector assemblies to the end rail;
biasing the connector assemblies in a direction outward from the side rails; and
rotating the end rail to cause the tonneau cover to move between an open and a closed position.

20. A method of maintaining tautness of a tonneau cover over a cargo box of a vehicle comprising the steps of:
providing a front rail;
providing a rear rail;
providing a pair of side rails;
attaching the tonneau cover to one of the front rail, the rear rail, and the pair of side rails;
providing spring assemblies;
securing the spring assemblies within the side rails;
attaching the spring assemblies to connector assemblies;
attaching the connector assemblies to the rear rail;
biasing the connector assemblies in a direction outward from the side rails; and
rotating the rear rail to cause the tonneau cover to move between an open and a closed position.

21. A tonneau cover apparatus comprising:
a frame structure having a pair of laterally spaced apart side rails, an end rail and a pair of connector assemblies, each of the connector assemblies being coupled to the end rail and movably mounted to an associated one of the side rails to thereby movably interconnect the end rail to the side rails;
a pair of springs, each of the springs being coupled to one of the side rails and contacting a corresponding one of the connector assemblies; and
a flexible cover removably attached to at least a portion of the frame structure;
wherein the springs bias the connector assemblies in a direction outwardly from the side rails such that the end rail applies a force to the flexible cover to maintain the flexible cover in a taut state,
wherein each of the connector assemblies includes a fixed component and a rotatable component, the fixed component including a first plug end and a second end, the first plug end being removably secured to the associated one of the side rails, the second end having an aperture; the rotatable component including a third plug end and a post end, the third plug end being removably secured to the end rail; and the post end is removably disposed within the aperture.

22. A tonneau cover apparatus comprising:
a frame structure having a pair of laterally spaced apart side rails, a front rail, a rear rail, a pair of front connector assemblies and a pair of rear connector assemblies, each of the front connector assemblies being coupled to the front rail and secured to an associated one of the side rails, each of the rear connector assemblies being coupled to the rear rail and movably mounted to the associated one of the side rails to thereby movably interconnect the rear rail to the side rails;
a pair of springs, each of the springs being coupled to one of the side rails and contacting a corresponding one of the rear connector assemblies; and
a flexible cover removably attached to at least a portion of the frame structure;
wherein the springs bias the rear connector assemblies in a direction opposite the front rail such that the rear rail applies a force to the flexible cover to maintain the flexible cover in a taut state,
wherein each of the rear connector assemblies includes a fixed component and a rotatable component; the fixed component includes a first plug end and a second end having an aperture, the first plug end is removably secured to the associated one of the side rails; the rotatable component includes a third plug end and a post end, the third plug end is removably secured to the end rail; and the post end is removably secured to the aperture.

* * * * *